US005561851A

United States Patent [19]
Hubbell et al.

[11] Patent Number: 5,561,851
[45] Date of Patent: Oct. 1, 1996

[54] SYSTEM AND METHOD FOR ENSURING THE AVAILABILITY OF A RADIO DATA COMMUNICATIONS LINK

[75] Inventors: Kirk A. Hubbell; Paul J. Mickelson, both of Austin, Tex.

[73] Assignee: Arrowsmith Technologies, Inc., Austin, Tex.

[21] Appl. No.: 249,797

[22] Filed: May 26, 1994

[51] Int. Cl.$^6$ ........................................ H04B 7/00
[52] U.S. Cl. ............................... 455/54.1; 455/67.1
[58] Field of Search .......................... 455/33.1, 54.1, 455/54.2, 56.1, 68, 67.1, 70

[56] References Cited

U.S. PATENT DOCUMENTS

| | | | |
|---|---|---|---|
| 4,056,779 | 11/1977 | Toler | 455/17 |
| 4,414,661 | 11/1983 | Karlstrom | 370/95.1 |
| 4,484,353 | 11/1984 | Flottes et al. | 455/33.1 |
| 4,517,561 | 5/1985 | Burke et al. | 340/825.07 |
| 4,658,435 | 4/1987 | Childress et al. | 455/17 |
| 4,774,672 | 9/1988 | Tsunoda et al. | 364/449 |
| 5,054,109 | 10/1991 | Blackburn | 455/17 |
| 5,276,911 | 1/1994 | Levine et al. | 455/54.1 |
| 5,289,527 | 2/1994 | Tiedemann, Jr. | 455/54.1 |

*Primary Examiner*—Reinhard J. Eisenzopf
*Assistant Examiner*—Marsha D. Banks-Harold
*Attorney, Agent, or Firm*—Vinson & Elkins L.L.P.

[57] ABSTRACT

A system and method for ensuring the availability of a radio data communications link for radio data messages between a fleet of mobile stations and a fixed base station is disclosed. The radio data messages between the mobile stations and the base station are composed of both routine messages as well as non-routine, priority messages. A parameter for adjusting the frequency of the routine messages is transmitted from the base station to the mobile stations. Over a selected time period, the number of radio data messages from the mobile stations to the base station which require multiple transmissions for successful receipt by the base station is monitored. At the end of this time period, the parameter is adjusted in response to the number of radio data messages which required multiple transmissions for successful receipt by the base station. The system repeats this method so that the frequency of the routine radio data messages is dynamically controlled.

20 Claims, 4 Drawing Sheets

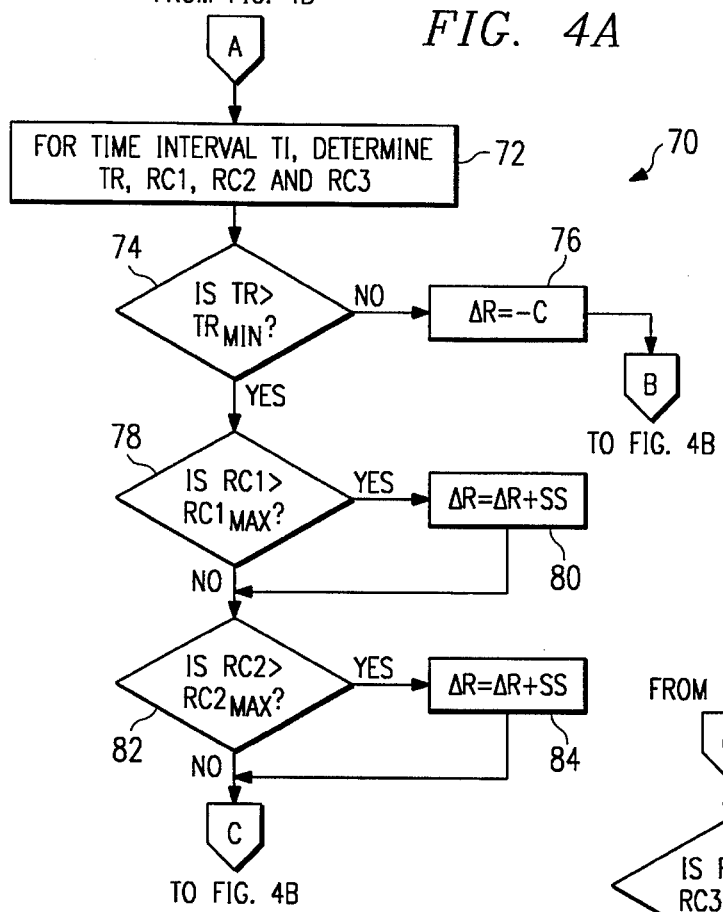
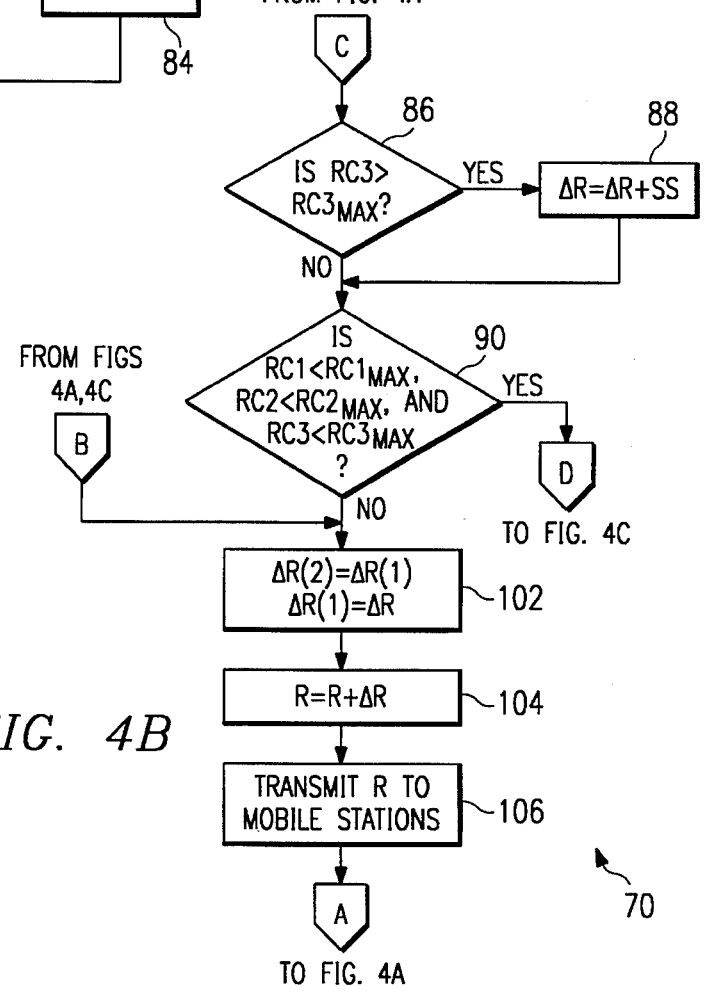
FIG. 4A
FIG. 4B

SYSTEM AND METHOD FOR ENSURING THE AVAILABILITY OF A RADIO DATA COMMUNICATIONS LINK

This invention relates generally to systems for ensuring the availability of a radio data communications link for radio data messages, and is more particularly directed to ensuring the availability of a radio data communications link for priority data exchanges between a fleet of mobile stations and a fixed base station.

BACKGROUND OF THE INVENTION

The ability of a fleet of mobile stations, such as service vehicles used in a variety of industries, to transmit radio data messages to a fixed base station over a selected radio channel is well-known in the art. As the number of mobile stations in the fleet, or more specifically, the number of messages transmitted between the mobile stations and the base station increases, a protocol must be employed to ensure the availability of the radio data communications link for priority data exchanges between the mobile stations and the base station. Several existing techniques have been employed to address this problem.

One known method of addressing this problem is to limit the number of mobile stations in a fleet or to increase the number of radio channels assigned to a fleet. However, this solution leads to inefficient use of the radio channel or channels employed, and it is typically not cost effective in practice.

Time division multiplexing is another conventional solution to this problem. In time division multiplexing, each mobile station in the fleet is given a dedicated time slot over a given time interval for communication with the base station. Each mobile station can only communicate to the base station during its dedicated time slot. Time division multiplexing is an effective technique in systems with a large number of mobile stations and a large number of messages which need to be communicated to the base station. However, this technique results in inefficient use of a radio data communications link if a given mobile station does not send a message during its dedicated time slot or fails to fully utilize its time slot for communication. In addition, a given mobile station can only send a limited amount of information during its dedicated time slot.

Polling techniques have also been employed in the prior art to address this problem. Under a polling technique, no mobile station transfers any message to the base station unless and until it receives a message from the base station asking for information. Therefore, polling also results in inefficient use of a radio data communications link because every communication between a given mobile station and the base station must be initiated by a polling message from the base station.

Contention protocols are another known technique used to address this problem. In a contention protocol, each time a mobile station sends a radio data message to the base station, the mobile station expects an acknowledgment from the base station indicating successful receipt of its message. If the mobile station does not receive this acknowledgement, the mobile station repeatedly re-transmits its message after a random time delay until acknowledgement is received. A failure to receive an acknowledgment from the base station is typically due to (1) overlap between multiple radio data messages which arrive at the base station at approximately the same time, (2) the mobile station being out of radio range of the base station, or (3) the mobile station being in a "radio valley or hole." Re-transmissions due to cause (1) often create problems in known contention protocols. As the number of messages to be transmitted between the mobile stations and the base station increases, the frequency of re-transmissions necessitated by overlapping messages increases, and the availability of the radio data communications link decreases in a cascading manner.

Finally, in environments in which mobile stations are required to send both routine position updates and also non-routine, priority messages to a base station, existing systems have employed the technique of having each individual mobile station transmit its position update to the base station only when it has traveled a fixed, radial distance since it last transmitted a position update. Assuming that the volume of the routine position updates accounts for a sufficiently large proportion of the total data messages transmitted between the mobile stations and the base station, controlling the volume of the routine position updates can increase overall radio data communications link availability. However, this technique results in inefficient use of a radio data communications link when the link has sufficient availability to handle more frequent position updates, and this technique does not ensure communications link availability during high volumes of non-routine messages.

It is therefore an object of the present invention to provide an improved system for ensuring the availability of a radio data communications link for priority radio data messages between a fleet of mobile stations and a fixed base station.

It is a further object of the present invention to provide such a system for operation in an environment in which routine data messages and non-routine, priority data messages are sent from the mobile stations to the base station.

It is a further object of the present invention to provide such radio data communications link availability by dynamically altering the frequency of the routine data messages from the mobile stations to the base station in response to the number of data messages requiring multiple transmissions for successful receipt by the base station.

It is a further object of the present invention to provide such radio data communications link availability by dynamically altering the frequency of the routine data messages from the mobile stations to the base station in response to the number of data messages successfully received by the base station.

It is a further object of the present invention to optimize the overall use of the radio data communication link and to achieve a more uniform flow of radio data messages.

Still other objects and advantages of the present invention will become apparent to those of ordinary skill in the art having references to the following specification together with its drawings.

SUMMARY OF THE INVENTION

The present invention provides a system and method for ensuring the availability of a radio data communications link for radio data messages of both the routine type and the non-routine, priority type. A parameter for setting the frequency of the routine radio data messages is transmitted from a base station to the source of the routine radio data messages. Over a selected time period, the number of radio data messages which required multiple transmissions for successful receipt by the base station is monitored. At the end of this time period, the parameter is adjusted in response to the number of radio data messages which required multiple transmissions for successful receipt.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4a–4c depict a flow diagram of the preferred method for dynamically controlling the volume of radio data messages from multiple mobile stations to a fixed base station according to the present invention.

DETAILED DESCRIPTION OF THE PREFERRED EMBODIMENTS

The preferred embodiments of the present invention and its advantages are best understood by referring to FIGS. 1–5 of the drawings, like numerals being used for like and corresponding parts of the various drawings.

Figure 1:
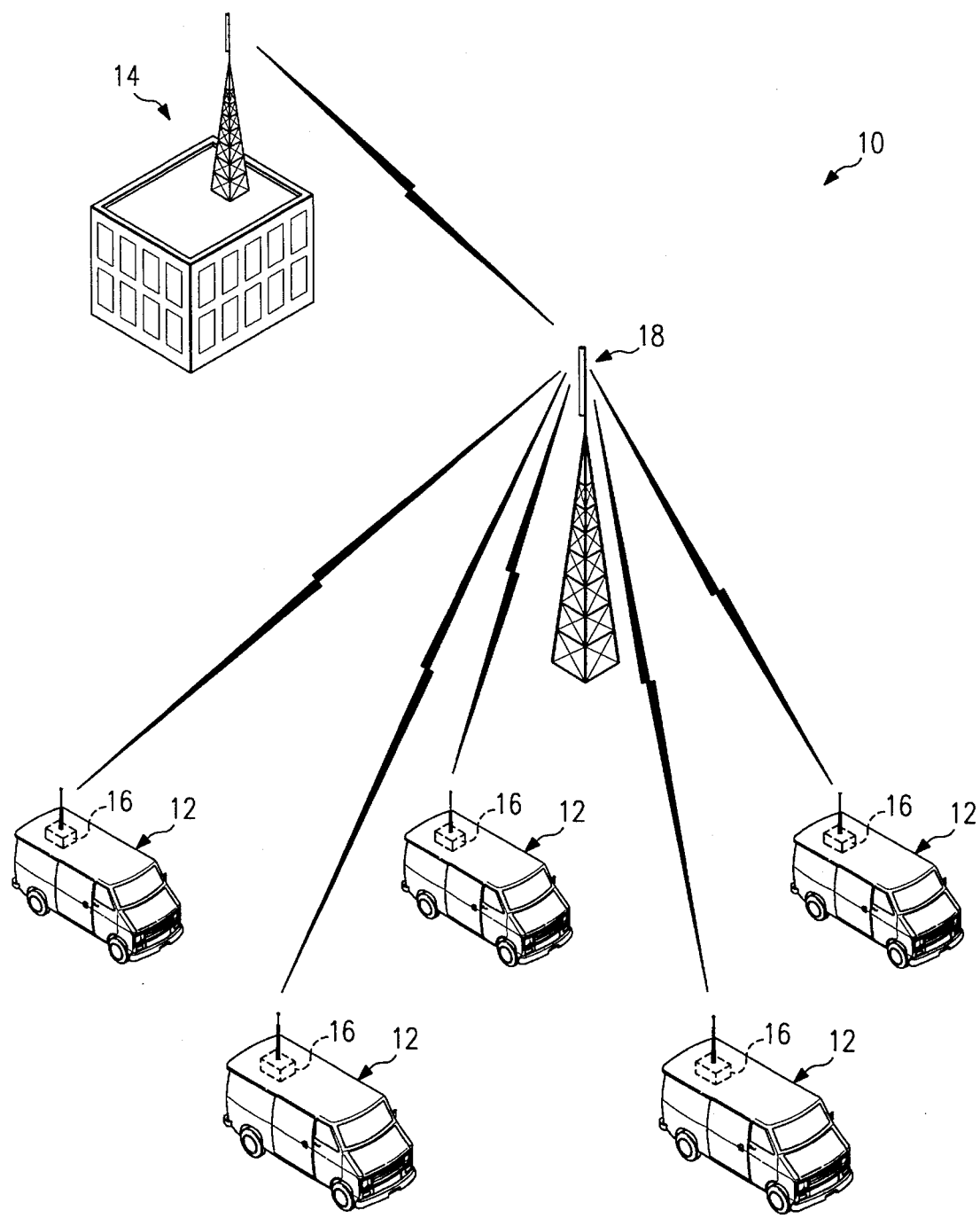
FIG. 1 is a schematic diagram of the preferred radio data communications link of the present invention.

FIG. 1 illustrates a radio data communications link 10 between a fleet of vehicles 12 and a base station 14 according to the preferred embodiment of the present invention. Radio data communications link 10 includes a mobile station 16 located in each vehicle 12, a tower repeater 18, base station 14, and a selected radio channel or frequency. Mobile station 16 is described in more detail in connection with FIG. 2, and base station 14 is described in more detail in connection with FIG. 3.

Vehicles 12 are preferably vehicles making service calls at customer worksites located throughout a city, such as are typically used in the cable television industry; the plumbing industry; the heating, ventilation, and air conditioning (HVAC) industry; the lawncare industry; the security system industry; or other similar service industries. Although only five vehicles 12 are shown in FIG. 1, this number is for clarity of illustration only, and a typical fleet of vehicles 12 would include many more vehicles. Base station 14 is typically a control center which monitors the status of vehicles 12 and the customer worksites. In addition, base station 14 also typically provides vehicles 12 with worksite assignments and job information.

Each of mobile stations 16 located in each vehicle 12 can transmit radio data messages to and receive radio data messages from base station 14 via radio data communications link 10. Similarly, base station 14 can transmit radio data messages to and receive radio data messages from any or all of mobile stations 16 through radio data communications link 10. Radio data communications link 10 is operable with any radio frequency. However, by way of example and for purposes of illustration only, the selected radio channel or frequency of radio data communications link 10 could be 400 Mhz or 800 Mhz.

Figure 2:
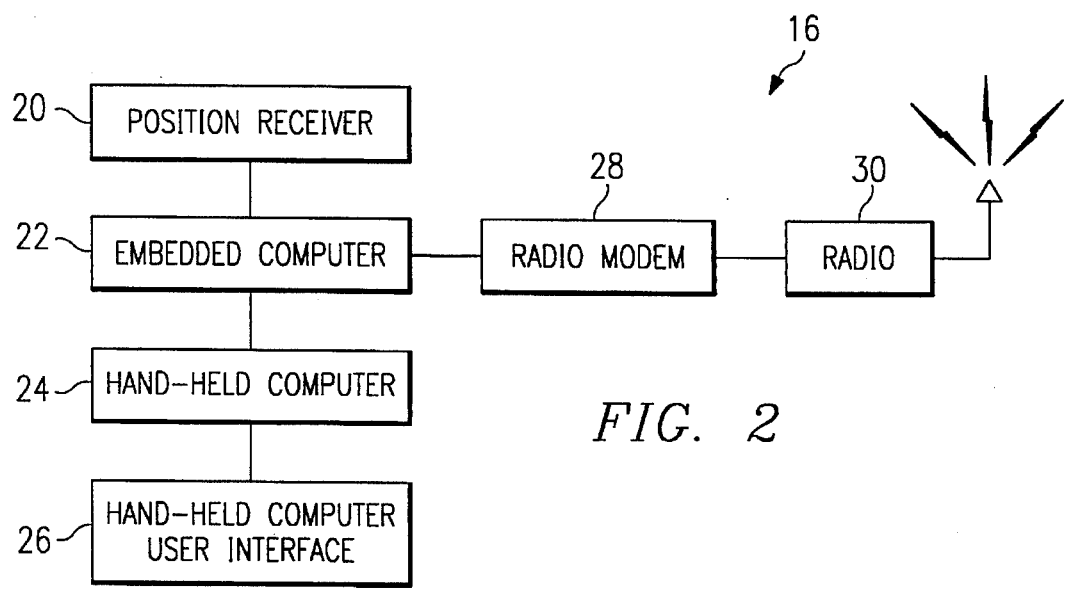
FIG. 2 is a schematic diagram of the preferred mobile station of the present invention.

FIG. 2 depicts mobile station 16 located in each vehicle 12 according to the preferred embodiment. A position receiver 20, such as Loran C, GPS system, or other positioning system, periodically provides accurate positional information for each mobile station 16 to an embedded computer 22. Each mobile station 16 is required to automatically provide a position update to base station 14 on a routine basis. Position receiver 20 cooperates with embedded computer 22 to initiate this position update function, as is later described in more detail in connection with FIG. 5.

In addition, mobile station 16 preferably includes a hand-held computer 24 electronically connected to embedded computer 22, and hand-held computer 24 preferably has a hand-held computer user interface 26. Hand-held computer 24 and user interface 26 allow an operator of mobile station 16 to initiate the transmission of non-routine, priority messages from mobile station 16 to base station 14. By way of example, user interface 26 preferably includes buttons to initiate the transmission of standard pre-programmed messages such as "in-route," "job-in-progress," and "on-break." In addition, user interface 26 preferably also includes a keypad to initiate the transmission of textual messages and a display so that an operator of mobile station 16 can view messages sent from base station 14 to mobile station 16.

Embedded computer 22 is electronically connected to a radio modem 28, and radio modem 28 is electronically connected to a radio 30. Radio modem 28 and radio 30 cooperate to transmit messages from embedded computer 22 and hand-held computer 24 to base station 14, and radio 30 and radio modem 28 also cooperate to receive messages from base station 14. Embedded computer 22 operates a contention protocol in which every time radio modem 28 transmits a radio data message to base station 14, radio modem 28 expects an acknowledgment from base station 14 in return. If radio modem 28 does not receive such an acknowledgment, radio modem 28 automatically re-transmits the unsuccessful radio data message after a random time delay. In addition, embedded computer 22 embeds into each radio data message transmitted by radio modem 28 the number of re-transmissions required for successful receipt by base station 14.

Figure 3:
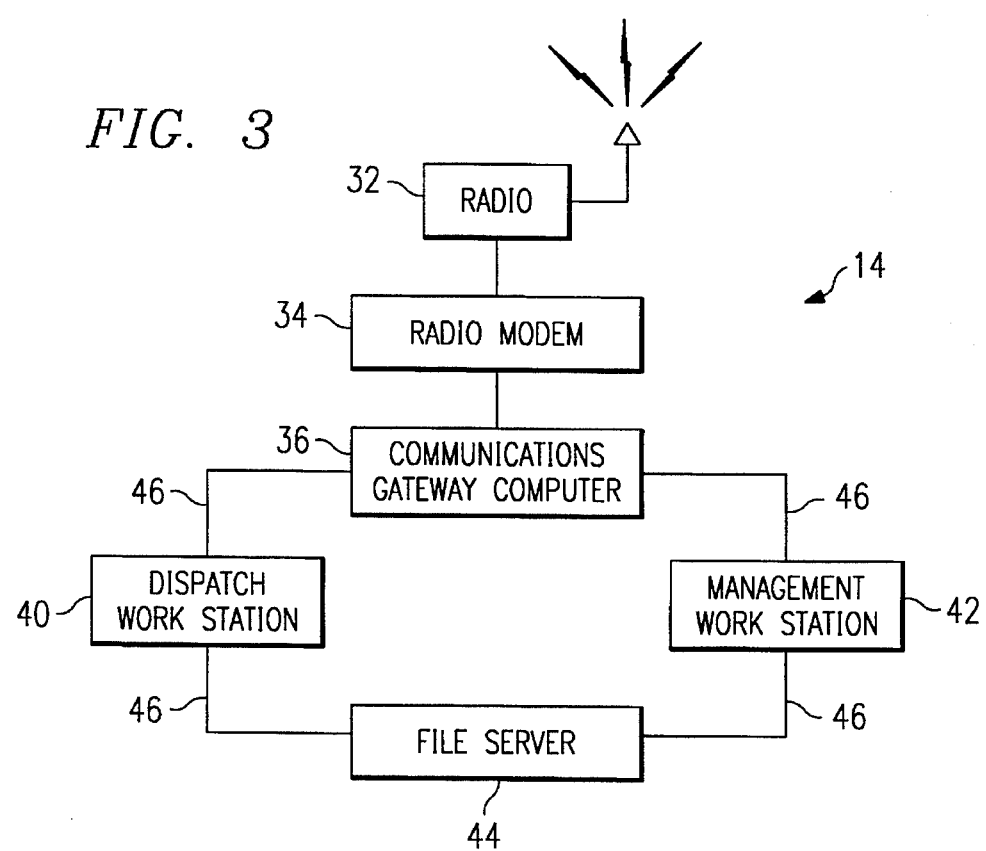
FIG. 3 is a schematic diagram of the preferred base station of the present invention.

FIG. 3 illustrates base station 14 according to the preferred embodiment. A radio 32 electronically connected to a radio modem 34 cooperate to receive radio data messages from each mobile station 16, and radio modem 34 and radio 32 also cooperate to transmit radio data messages to any or all of mobile stations 16. A communications gateway computer 36 is electronically connected to radio modem 34. Communications gateway computer 36 processes the radio data messages received from radio 32 and radio modem 34 according to a method 70 (not shown) to ensure the availability of radio data communications link 10 for priority radio data messages between mobile stations 16 and base stations 14. Method 70 is described in more detail in connection with FIGS. 4a–4c. In addition, communications gateway computer 36 transfers the radio data messages received from radio 32 and radio modem 34 into a format meaningful to the components of base station 14. Furthermore, communications gateway computer 36 preferably operates a contention protocol for radio modem 34 similar to the contention protocol operated by embedded computer 22 for radio modem 28.

Base station 14 also preferably includes a dispatch work station 40 and a management work station 42. Dispatch work station 40 has dispatch work station software capable of displaying the location of mobile stations 16 on a two-dimensional map display; the status of mobile stations 16 on the map display (e.g. "in-route," "job-in-progress," "on-break"); the location of worksites on the map display; and the status of worksites on the map display (e.g., "scheduled," "in-work," and "completed"). Dispatch work station 40 can preferably pan and zoom to display various levels of detail on the map display and to focus on selected mobile stations 16 within the displayed area. Management work station 42 has management work station software with the same functionality as the software of dispatch work station 40, as well as the ability to create various preprogrammed management reports and to process worksite scheduling information. Both dispatch work station 40 and management work station 42 enable an operator to initiate the transmission of worksite assignments, job information, and other textual messages to mobile stations 16.

Base station 14 also preferably includes a file server 44. File server 44 maintains master copies of all radio data messages transferred between mobile stations 16 and base station 14, worksite scheduling information, and other customer/worksite information. File server 44 also preferably embeds a time/date code to the master copy of each radio data message. A local area network 46, preferably using a TCP/IP communication protocol, electronically connects communications gateway computer 36, dispatch work station 40, management work station 42, and file server 44. The number of dispatch work stations 40, management work stations 42, and file servers 44 in FIG. 3 is for purposes of illustration only and is not critical to the operation of the present invention. In addition, when the preferred embodiment is implemented with a small number of mobile stations 16, a single computer could perform the functions of communications gateway computer 36, dispatch work station 40, management work station 42, and file server 44, eliminating the need for local area network 46.

Figure 4C:
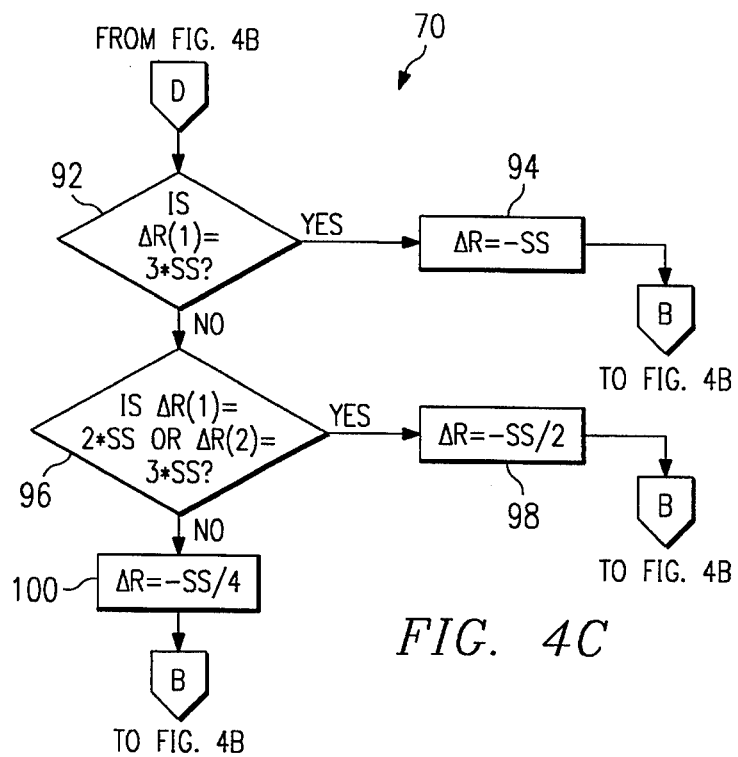

The present invention may be most advantageously utilized where the radio data messages from mobile stations 16 to base station 14 include routine radio data messages as well as non-routine, priority radio data messages. In addition, the routine radio data messages preferably account for a sufficiently large proportion of the total radio data messages so that control of the volume of the routine messages over radio data communications link 10 ensures its availability for priority messages between mobile stations 16 and base station 14. FIGS. 4a–4c illustrate a method 70 employed by communications gateway computer 36 to dynamically control the frequency of one such routine message, an automatic position update from each mobile station 16 to base station 14.

According to the preferred embodiment of the invention, communications gateway computer 36 employs method 70 to generally monitor the loading of radio data communications link 10. If communications gateway computer 36 determines that radio data communications link 10 is too heavily loaded, communications gateway computer 36 preferably initiates the transmission of a parameter to all mobile stations 16 which results in a corresponding decrease in the frequency of the automatic position updates transmitted by mobile stations 16. This frequency decrease ensures that radio data communications link 10 has sufficient availability to handle priority messages. Conversely, if communications gateway computer 36 determines that radio data communications link 10 has extra availability, communications gateway computer 36 preferably initiates the transmission of a parameter to all mobile stations 16 which results in a gradual increase in the frequency of the automatic position updates transmitted by mobile stations 16. This frequency increase results in a finer time resolution for the display of the positions of mobile stations 16 on display work station 40. Method 70 is continually repeated by communications gateway computer 36 to optimize the loading of radio data communications link 10.

For each individual application of method 70, several parameters must be optimized through calibration or tuning. These parameters include:

TI=the sampling time period for method 70, having a default value of one minute $TR_{MIN}$=the minimum number of messages successfully transmitted from mobile stations 16 to base station 14 over TI.

$RC1_{MAX}$=the maximum acceptable number of messages over TI which are received by base station 14 after at least one re-transmission initiated by radio modem 28 of a given mobile station 16.

$RC2_{MAX}$=the maximum acceptable number of messages over TI which are received by base station 14 after at least two re-transmissions initiated by radio modem 28 of a given mobile station 16.

$RC3_{MAX}$=the maximum acceptable number of messages over TI which are received by base station 14 after at least three re-transmissions initiated by radio modem 28 of a given mobile station 16.

SS=the constant stepsize for a change in the variable ΔR.

Referring to process 72 of FIG. 4a, the number of radio data messages successfully transmitted from mobile stations 16 to base station 14 (TR), the number of radio data messages successfully transmitted from mobile stations 16 to base station 14 requiring at least one re-transmission (RC1), the number of radio data messages successfully transmitted from mobile stations 16 to base station 14 requiring at least two re-transmissions (RC2), and the number of radio data messages successfully transmitted from mobile stations 16 to base station 14 requiring at least three re-transmissions (RC3) are counted for the current time interval (TI). As discussed previously, the number of re-transmissions required for each individual radio data message is embedded into each radio data message by embedded computer 22 of a given mobile station 16. As indicated by decision block 74, if TR exceeds a minimum threshold $TR_{MIN}$ for the current TI, method 70 examines the level of re-transmissions in radio data communications link 10 for the current TI. However, if TR does not exceed $TR_{MIN}$, a variable ΔR for the current TI is set to a small, negative constant C in process 76. As is later discussed in greater detail in connection with FIG. 5, ΔR represents the change in a distance parameter R for the current TI, and distance parameter R represents the radial distance each mobile station 16 must travel before each mobile station 16 transmits a position update to base station 14. Next, as shown in process 102 of FIG. 4b, the value of ΔR for a time interval two time intervals prior to the current TI (ΔR(2)) is reset to the value of ΔR for the time interval prior to the current TI (ΔR(1)), and ΔR for the time interval prior to the current TI (ΔR(1)) is reset to the value of ΔR for the current TI. As shown by processes 104 and 106, the value of R is then decreased by the small constant C, and the decreased value of R is transmitted from base station 14 to mobile stations 16.

Although not shown in FIG. 4a, method 70 may employ the additional step of monitoring the time duration of the radio data messages successfully transmitted from mobile stations 16 to base station 14 for the current TI. In this additional step, even if TR does not exceed $TR_{MIN}$, this time duration is compared to a predetermined threshold to ensure that a small number of radio data messages having a relatively long time duration do not disrupt the availability of radio data communications link 10.

Returning to decision block 74 in FIG. 4a, if TR exceeds $TR_{MIN}$ for the current TI, each of the three re-transmission counters, RC1, RC2, and RC3, are compared with their corresponding re-transmission thresholds $RC1_{MAX}$, $RC2_{MAX}$, and $RC3_{MAX}$. As is shown in steps 78–88 of FIGS. 4a and 4b, each time a re-transmission counter exceeds its corresponding re-transmission threshold, the value of ΔR is increased by a constant stepsize SS. Therefore, if all three re-transmission counters exceed their corresponding re-transmission thresholds, the value of ΔR is increased by 3*SS. Similarly, if two re-transmission counters exceed their corresponding re-transmission thresholds, the value of ΔR is increased by 2*SS. If only one re-transmission counter exceeds its corresponding re-transmission threshold, the value of ΔR is increased by SS. As shown in decision block 90 of FIG. 4b, as long as one re-transmission counter exceeds its corresponding re-transmission threshold, processes 102, 104, and 106 are repeated as described previously, culminating in the transmission of an increased value of R from base station 14 to mobile stations 16 in process 106.

Referring again to decision block 90, if none of the re-transmission counters exceed their corresponding re-transmission thresholds, the value of ΔR for the current TI will be decreased, as is shown in steps 92–100 of FIG. 4c. This decrease in ΔR is performed responsive to the value of ΔR over the two time intervals prior to the current TI. As shown in decision block 92 and process 94, if during the previous time interval ΔR was equal to 3*SS, the value of ΔR is assigned to −SS. As shown in decision block 96 and process 98, if ΔR was equal to 2*SS in the time interval prior to the current TI or ΔR was equal to 3*SS two time intervals prior to the current TI, ΔR is assigned a value of −SS/2. Otherwise, as shown in process 100, ΔR is assigned a value of −SS/4. After this assignment of a decremental value to ΔR, processes 102, 104, and 106 of FIG. 4b are repeated as described above, culminating with the transmission of a decreased value of R from base station 14 to mobile stations 16 in process 106.

As is later explained in more detail in connection with FIG. 5, the frequency of the automatic position update of each mobile station 16 is inversely proportional to the value of the distance parameter R. A comparison of steps 78–88 of FIGS. 4a–4b with steps 92–100 of FIG. 4c reveals that method 70 generally decreases the frequency of the automatic position updates of mobile stations 16 due to a high number of re-transmitted radio data messages in radio data communications link 10 faster than it increases the frequency of the automatic position updates of mobile stations 16 after the number of re-transmitted radio data messages begins to decrease. In this manner, method 70 ensures the availability of radio data communications link 10 for priority data exchanges between mobile stations 16 and base station 14, avoids a "thrashing" condition in radio data communications link 10, and achieves a more even flow of radio data messages in radio data communications link 10.

Figure 5:
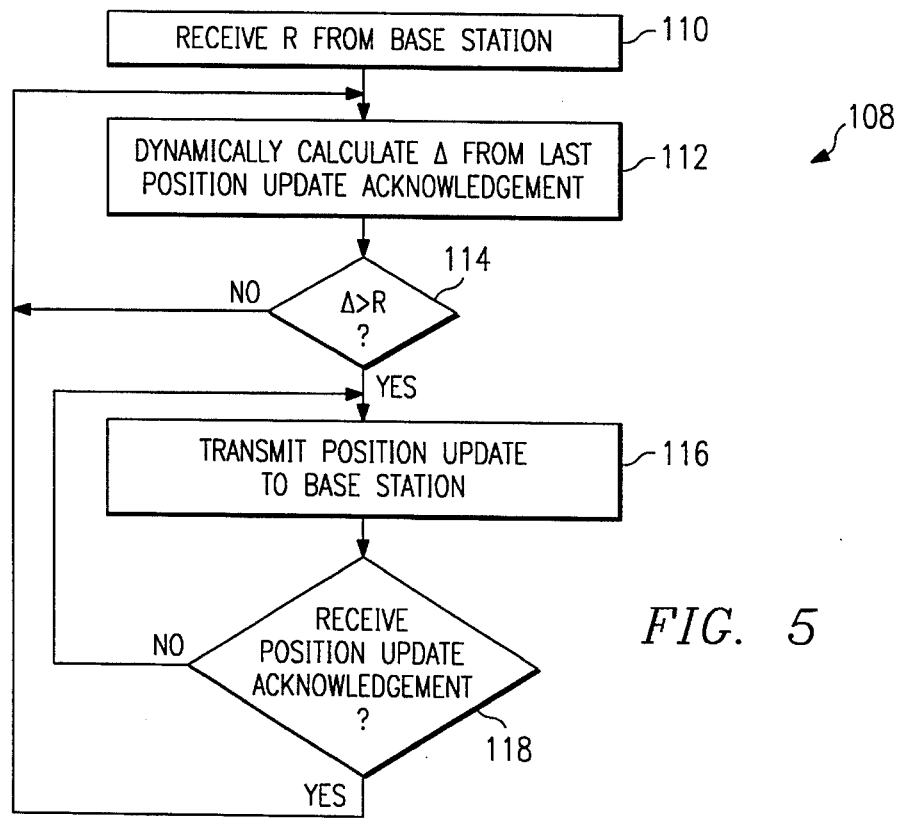
FIG. 5 is a flow diagram of the preferred method for transmitting a position update of a mobile station to a base station according to the present invention.

FIG. 5 is a flow diagram of a method 108 employed by embedded computer 22 of each mobile station 16 to adjust the frequency of the automatic position updates to base station 14. As shown in process 110, each mobile station 16 periodically receives an adjusted value of distance parameter R from base station 14, as is described in FIGS. 4a–4c. As shown in process 112, embedded computer 22 and position receiver 20 of each mobile station 16 dynamically calculate a distance parameter Δ corresponding to the radial distance from the location at which radio modem 28 of mobile station 16 last received a position update acknowledgement from radio modem 34 of base station 14. According to decision block 114, when Δ exceeds the distance parameter R, mobile station 16 automatically transmits a position update to base station 14, as shown by process 116. As indicated by decision block 118, radio modem 28 of mobile station 16 continues to re-transmit the position update to base station 14 until a position update acknowledgement is received by radio modem 28 of mobile station 16. Once this position update acknowledgement is received, embedded computer 22 cooperates with position receiver 20 to begin recalculating distance parameter Δ, as shown by process 112. In addition, although not shown in FIG. 5, method 108 may also employ the additional step of suspending all automatic position updates from all mobile stations 16 until the value of distance parameter R received from base station 14 in process 110 is less than a predetermined threshold.

Although the calculation of distance parameter R by method 70 of FIGS. 4a–4c is the preferred method of updating the frequency of automatic position updates of mobile stations 16 according to the present invention, several optional steps may be added to method 70 in specific situations. A first optional step is having base station 14 transmit different values of R to different mobile stations 16 depending upon the relative importance of maintaining accurate positional information.

For example, dispatch work station 40 may automatically relay to communications gateway computer 36 that mobile stations 16 having an "on-break" status should be assigned a large value of R relative to all other mobile stations 16 in a fleet of vehicles 12. In response, communications gateway computer 36 transmits this large value of R to the "on-break" mobile stations 16 by employing an address list in process 106 of method 70 indicating which mobile stations 16 should respond to, or alternatively which mobile stations 16 should ignore, the transmitted value of R. As another example, when an operator of dispatch work station 40 "zooms in" on a particular subset of mobile stations 16 deployed in a particular area, dispatch work station 40 may automatically relay to communications gateway computer 36 that this subset of mobile stations 16 should be assigned a smaller value of R relative to all other mobile stations 16 in a fleet of vehicles 12. Communications gateway computer would respond using an address list in process 106 of method 70 to accomplish this result. In either example, communications gateway computer 36 performs method 70 to continually adjust the R values for the mobile stations 16 not "on-break" or not in the "zoom area." This first optional step could also be employed whenever method 70 demands an excessively large R value to ensure the availability of radio data communications link 10.

A second optional step to method 70 similar to the first optional step described above could be employed when selected mobile stations 16 are experiencing an emergency condition. Each operator of mobile station 16 in an emergency uses hand-held computer user interface 26 to initiate the transmission of a small R value unique to the individual mobile station 16 to base station 14. In response, communications gateway computer 36 uses an address list in process 106 of method 70 to transmit a relatively large value of R to all other mobile stations 16 in the fleet of vehicles 12. Communications gateway computer 36 then performs method 70 to continually adjust the R values for the mobile stations 16 not experiencing an emergency.

A third optional step to method 70 may be employed where multiple dispatch work stations independently control groups of mobile stations 16 over the same radio channel. This third optional step is contemplated to be especially useful with large fleets of vehicles 12, as control of the fleet can be divided among several dispatch work stations 40. According to this option, each dispatch work station 40 uses an address list to transmit R values to the given group of mobile stations 16 under its control, and each dispatch work station 40 can also transmit selected R values to selected mobile stations 16 within its group, if desired. Method 70 is performed by each dispatch work station 40 to continually adjust the R values for the group of mobile stations 16 under its control and to insure the overall availability of radio data communications link 10 for priority data messages.

As shown by method 70 of FIGS. 4a–4c and method 108 of FIG. 5, communications gateway computer 36 continually monitors the level of loading in radio data communications link 10 by monitoring the number of re-transmissions required for each radio data message sent from mobile stations 16 to base station 14. This number of re-transmissions is embedded into each radio data message by embedded computer 22 of each mobile station 16. Based on this monitoring, communications gateway computer 36 periodically initiates the transmission of an adjusted value of distance parameter R to mobile stations 16 via radio data communications link 10. Embedded computer 22 and position receiver 20 of a given mobile station 16 do not initiate an automatic position update to base station 14 until the distance Δ from the last position update acknowledgement received by radio modem 28 of the given mobile station 16 exceeds the adjusted value of the distance parameter R. Therefore, by dynamically controlling the frequency of automatic position updates to base station 14, the preferred embodiment ensures the availability of radio data communications link 10 for priority messages and optimizes the loading of radio data communications link 10.

From the above, it may be appreciated that the embodiments of the present invention ensure the availability of a radio data communications link between a fleet of mobile stations and a fixed based station by dynamically controlling the frequency of automatic, routine positional updates from each mobile station to the base station. The present invention is illustrated herein by example, and various modifications may be made by a person of ordinary skill in the art. For example, the present invention could ensure radio data communication link availability by controlling the frequency of routine messages transferred from the mobile stations to the base station other than a position update message. As another example, various substitutions could be made to the specific hardware and software providing the radio data communications link between the mobile stations and base station while still achieving an equivalent function. Furthermore, the frequency of routine messages transmitted from the mobile stations to the base station could be dynamically controlled by various alternative functions of the number of radio data messages from the mobile stations to the base station requiring re-transmission before successful receipt by the base station. Consequently, while the invention has been described in connection with what is presently considered to be the most practical and preferred embodiments, it is to be understood that the invention is not limited to the disclosed embodiments and is intended to cover various modifications and equivalent arrangements included within the spirit and scope of the following claims.

What is claimed is:

1. A method for controlling the number of radio data messages received by a base station over a radio channel, the radio data messages comprising routine messages and non-routine messages from a plurality of mobile stations, said method comprising the steps of:

transmitting to the plurality of mobile stations via the radio channel a first parameter for setting a frequency of occurrences of the routine messages;

monitoring, over a time period, a number of the radio data messages from the plurality of mobile stations requiring multiple transmissions for successful receipt by the base station; and adjusting the first parameter responsive to the number of radio data messages requiring multiple transmissions determined in said monitoring step.

2. A method for controlling the number of radio data messages received by a base station over a radio channel, the radio data messages comprising routine messages and non-routine messages from a plurality of mobile stations, said method comprising the steps of:

transmitting to the plurality of mobile stations via the radio channel a first parameter for setting a frequency of occurrences of the routine messages;

monitoring a number of the radio data messages requiring multiple transmissions for successful receipt by the base station over a time period;

adjusting the first parameter responsive to the number of radio data messages requiring multiple transmissions determined in said monitoring step;

calculating, at a first one of the plurality of mobile stations, a second parameter corresponding to a distance from a location at which the first one of the plurality of mobile stations received a first position update acknowledgement from the base station via the radio channel;

transmitting a position update for the first one of the plurality of mobile stations to the base station via the radio channel responsive to the second parameter exceeding the first parameter; and transmitting a second position update acknowledgement from the base station to the first one of the plurality of mobile stations via the radio channel upon receipt of the position update.

3. The method of claim 2 wherein said step of transmitting the position update is performed responsive to the first parameter not exceeding a predetermined threshold.

4. The method of claim 2 wherein said step of transmitting the first parameter comprises:

transmitting a first value of the first parameter to a first one of the plurality of mobile stations; and transmitting a second value of the first parameter larger than the first value to a second one of the plurality of mobile stations.

5. The method of claim 4 wherein said adjusting step is only performed for the first value of the first parameter transmitted to the first one of the plurality of mobile stations.

6. The method of claim 4 wherein said adjusting step is only performed for the second value of the first parameter transmitted to the second one of the plurality of mobile stations.

7. The method of claim 2 further comprising:

transmitting a first value of the first parameter indicative of an emergency condition at a first one of the plurality of mobile stations from the first one of the plurality of mobile stations to the base station via the radio channel; and transmitting a second value of the first parameter larger than the first value from the base station to a second one of the plurality of mobile stations via the radio channel.

8. The method of claim 7 further comprising performing said adjusting step only for the second value of the first parameter transmitted to the second one of the plurality of mobile stations.

9. The method of claim 2 wherein:

the plurality of mobile stations comprises first and second groups of mobile stations; and said step of transmitting the first parameter, said monitoring step, and said adjusting step are performed for the first group of mobile stations independent from the second group of mobile stations.

10. The method of claim 1 further comprising monitoring a number of the radio data messages received by the base station over the time period, and wherein said adjusting step is performed responsive to the nuumber of radio data messages received exceeding a predetermined threshold.

11. The method of claim 1 wherein:

the plurality of mobile stations comprising first and second groups of mobile stations; and said step of transmitting the first parameter, said monitoring step, and said adjusting step are performed for the first group of mobile stations independent from the second group of mobile stations.

12. A method for controlling the number of radio data messages received by a base station over a radio channel, the radio data messages comprising routine messages and non-routine messages, said method comprising the steps of:

transmitting to a source of the routine messages via the radio channel a first parameter for setting a frequency of occurrences of the routine messages;

monitoring, over a time period, a first number of the radio data messages requiring at least one re-transmission for successful receipt by the base station; and monitoring, over the time period, a second number of the radio data messages requiring more than one re-transmission for successful receipt by the base station; and adjusting the first parameter responsive to the first and second numbers of the radio data messages requiring re-transmission.

13. A method for controlling the number of radio data messages received by a base station over a radio channel, the radio data messages comprising routine messages and non-routine messages, said method comprising the steps of:

transmitting to a source of the routine messages via the radio channel a first parameter for setting a frequency of occurrences of the routine messages;

monitoring a number of the radio data messages requiring multiple transmissions for successful receipt by the base station over a time period; and adjusting the first parameter responsive to the number of radio data messages requiring multiple transmissions determined in said monitoring step, wherein said adjusting step comprises adjusting the first parameter responsive to a magnitude of adjustment of the first parameter in at least one time period prior to the time period.

14. A method for controlling the number of radio data messages received by a base station over a radio channel, the radio data messages comprising routine messages and non-routine messages, said method comprising the step of:

transmitting to a source of the routine messages via the radio channel a first parameter for setting a frequency of occurrences of the routine messages;

monitoring a number of the radio data messages requiring multiple transmissions for successful receipt by the base station over a time period;

adjusting the first parameter responsive to the number of radio data messages requiring multiple transmissions for successful receipt by the base station;

monitoring a number of the radio data messages received by the base station over the time period;

monitoring a time duration of the number of radio data messages received; and adjusting the first parameter responsive to the number of radio data messages received not exceeding a first predetermined threshold and to the time duration of the number of radio data messages received exceeding a second predetermined threshold.

15. A system for controlling the number of radio data messages received by a first radio over a radio channel, the radio data messages comprising routine messages and non-routine messages from a plurality of second radios, comprising:

a first radio capable of transmitting and receiving over a radio channel;

a plurality of second radios capable of transmitting and receiving over the radio channel;

a plurality of first computers electronically coupled to respective ones of said plurality of second radios for:

transmitting the radio data messages to said first radio; and embedding a signal into each of the radio data messages transmitted to said first radio corresponding to a number of re-transmissions of each radio data message requiring for successful receipt by said first radio;

a second computer electronically coupled to said first radio for:

transmitting to said plurality of second radios a first parameter for setting a frequency of occurrences of the routine messages;

determining, over a time period, a total number of the radio data messages from said plurality of second radios requiring multiple transmissions for successful receipt by said first radio responsive to the signal embedded into each of the radio data messages by said plurality of first computers; and adjusting the first parameter responsive to the total number of radio data messages requiring multiple transmissions.

16. The system of claim 15 wherein:

said plurality of second radios comprises first and second groups of second radios; and said transmitting the first parameter, said determining a total number of the radio data messages requiring multiple transmissions, and said adjusting the first parameter are performed by said second computer for the first group of second radios independent from the second group of second radios.

17. The system of claim 15 wherein said determining a total number of the radio data messages requiring multiple transmissions performed by said second computer comprises:

determining a first number of the radio data messages requiring at least one re-transmission for successful receipt by said first radio; and determining a second number of the radio data messages requiring more than one re-transmission for successful receipt by said first radio; and wherein said adjusting the first parameter performed by said second computer comprises adjusting the first parameter responsive to the first and second numbers of the radio data messages requiring re-transmission.

18. The system of claim 15 wherein said adjusting the first parameter performed by said second computer comprises adjusting the first parameter responsive to a magnitude of adjustment of the first parameter in at least one time period prior to the time period.

19. The system of claim 15 wherein said second computer is further for:

determining, over the time period, a number of the radio data messages received by said first radio; and adjusting the first parameter responsive to the number of radio data messages received exceeding a predetermined threshold.

20. The system of claim 15 wherein said second computer is further for:

monitoring a number of the radio data messages received by said first radio over the time period;

monitoring a time duration of the number of radio data messages received; and adjusting the first parameter responsive to the number of radio data messages received not exceeding a first predetermined threshold and to the time duration of the number of radio data messages received exceeding a second predetermined threshold.

* * * * *

UNITED STATES PATENT AND TRADEMARK OFFICE
CERTIFICATE OF CORRECTION

PATENT NO. : 5,561,851
DATED : October 1, 1996
INVENTOR(S) : Kirk A. Hubbell, Paul J. Mickelson It is certified that error appears in the above-indentified patent and that said Letters Patent is hereby corrected as shown below:

Col. 11, ln. 8, delete "nuumber", insert --number--.

Col. 11, ln. 11, delete "comprising", insert --comprises--.

Col. 12, ln. 25, delete "requiring", insert --required--.

Signed and Sealed this

Fourteenth Day of January, 1997

Attest:

BRUCE LEHMAN

*Attesting Officer*    *Commissioner of Patents and Trademarks*